United States Patent
Lin

(10) Patent No.: US 7,127,149 B1
(45) Date of Patent: Oct. 24, 2006

(54) THREE-STAGE MENU PROCESSING FOR DIGITAL DISC RECORDER

(75) Inventor: Shu Lin, Indianapolis, IN (US)

(73) Assignee: Thomson Licensing, Boulogne (FR)

( * ) Notice: Subject to any disclaimer, the term of this patent is extended or adjusted under 35 U.S.C. 154(b) by 482 days.

(21) Appl. No.: 10/129,859

(22) PCT Filed: Oct. 30, 2000

(86) PCT No.: PCT/US00/29931

§ 371 (c)(1),
(2), (4) Date: Sep. 30, 2002

(87) PCT Pub. No.: WO01/35412

PCT Pub. Date: May 17, 2001

Related U.S. Application Data

(60) Provisional application No. 60/164,793, filed on Nov. 10, 1999.

(51) Int. Cl.
*H04N 9/79* (2006.01)
*H04N 7/00* (2006.01)
*H04N 5/91* (2006.01)
*G06G 9/00* (2006.01)

(52) U.S. Cl. .......................... 386/45; 386/46; 386/95; 386/96; 386/125; 386/126; 715/840; 715/846; 715/765

(58) Field of Classification Search ................. 386/45, 386/125–126, 111, 46, 95, 96; 715/840, 715/846, 765, 762, 813; 725/32; 717/100
See application file for complete search history.

(56) References Cited

U.S. PATENT DOCUMENTS

| | | | | |
|---|---|---|---|---|
| 5,276,795 A | * | 1/1994 | Hoeber et al. | 715/813 |
| 5,557,585 A | * | 9/1996 | Hanai et al. | 368/43 |
| 5,691,972 A | * | 11/1997 | Tsuga et al. | 369/275.3 |
| 5,907,704 A | * | 5/1999 | Gudmundson et al. | 717/100 |
| 5,929,857 A | | 7/1999 | Dinallo et al. | 345/354 |
| 5,963,704 A | | 10/1999 | Mimura et al. | 386/95 |
| 6,067,400 A | | 5/2000 | Saeki et al. | 386/95 |
| 6,357,042 B1 | * | 3/2002 | Srinivasan et al. | 725/32 |
| 6,453,459 B1 | * | 9/2002 | Brodersen et al. | 717/100 |

FOREIGN PATENT DOCUMENTS

| | | |
|---|---|---|
| EP | 738 078 A2 | 10/1996 |
| EP | 898 279 A2 | 2/1999 |
| EP | 929 072 A2 | 7/1999 |
| WO | 99/38167 | 7/1999 |
| WO | 00/30112 | 5/2000 |

* cited by examiner

*Primary Examiner*—Thai Tran
*Assistant Examiner*—Jamie J Vent
(74) *Attorney, Agent, or Firm*—Joseph J. Laks; Robert B. Levy; Jorge Tony Villabon

(57) ABSTRACT

A method for real time generation of menus in a DVD recorder. The method includes the steps of providing a template menu having one or more dummy buttons, activating a marking command during a video data recording session, and in response to the marking command, modifying the template menu by assigning to the dummy button a valid flow control command for accessing the video data which has been recorded.

20 Claims, 5 Drawing Sheets

THREE-STAGE MENU PROCESSING FOR DIGITAL DISC RECORDER

This application claims the benefit under 35 U.S.C. § 365 of International Application PCT/US00/29931, filed Oct. 30, 2000, which claims the benefit of U.S. Provisional Application 60/164,793, filed Nov. 10, 1999.

BACKGROUND OF THE INVENTION

1. Technical Field

The inventive arrangements relate generally to methods and apparatus providing advanced operating features for audio only, video only and both video and audio programs recorded on disc media, for example recordable digital video discs, hard drives and magneto optical discs.

2. Description of the Related Art

Various devices have been developed to enable consumers to record video and/or audio programs for later presentation. Such devices include tape recorders, video cassette recorders, recordable compact discs, and most recently, recordable digital video discs (DVD). Hard drives and magneto optical discs have also been used.

A DVD that can be recorded on only once, and thereafter is essentially a DVD read only memory, is referred to by the acronym DVD-R. The acronym DVD-R is also used generally to refer to the write-once, or record-once, technology. Several formats are available for DVD's to be recorded on, erased and re-recorded; that is, overwritten or rewritten. These are referred to by the acronyms DVD-RAM, DVD-RW and DVD+RW. As of this time no uniform industry standard has been adopted. The acronyms DVD-RAM, DVD-RW and DVD+RW are also used generally to refer to the respective rewritable technologies. Reference herein to rewritable DVD technology, devices and methods is generally intended to encompass all of the standards which are now being used, as well as those which may be developed in the future.

In many cases, the program presentations are recorded in the viewer and/or listener's absence, for presentation at a later, more convenient time. This is referred to as time shifting the program. At other times, a program is being viewed and/or listened to without being recorded, and without any interest in a recording, but the viewer's and/or listener's attention is interrupted, for example by a telephone call or an unexpected visitor. If the viewer and/or listener is watching a television program, for example, and has a cassette tape in a VCR, or can retrieve and load such a cassette tape quickly, the program can be recorded. However, the viewer and/or listener cannot view and/or listen to the program in its entirety, and in a proper time sequence, until after the recording has been completed. The time to completion of the recording can be short or long, depending on the length of the program.

Although rewritable DVD technology is generally available, operation is limited to such basic functions as play, record, fast forward reverse and stop. Pause is available, but only as a counterpart to pause operation in a VCR, for example interrupting the play back of a prerecorded program or interrupting the recording of a viewed program to eliminate commercials from the recording. Unlike computer hard drives, recordable DVD devices have a very significant additional function, which is playing back prerecorded DVD's. Thus, there is an economic incentive to develop rewritable DVD technology, including methods and devices, that can be used instead of a computer hard drive. It is a challenge to provide such devices with improved, advantageous features without compromising the goal of decreasing costs and increasing sales.

DVD technology allows the use of a variety of advanced features, including for example the ability to seamlessly branch from one part of a video presentation to another. In order to accommodate this, as well as other advanced features, the DVD-Video standard permits on-screen menus to be used. The menus permit users to control the video presentation by activating buttons appearing on a display screen. For example, menus allow users to navigate through the various video presentation contained on a disc, select from multiple programs, select different versions of the video presentation on the disc, and operate other advanced DVD features. Menus can also be used to navigate through interactive video programing which may be provided on the disc. The DVD standard also permits the use of sub-menus which may offer the user other control or selection options beyond what may be available in a main menu.

Menus play a key role in navigation of a disk. However, for a real-time recording device, such as DVD-RW, DVD+RW, DVD-RAM and Streamer, just name a few, it is very difficult to prepare and record menus in real-time. In particular, the creation of a menu normally requires a user to know certain information. For example, a menu for navigating through a series of video presentations or recordings requires the user to know what the video presentation will be. Such information is necessary in order to properly identify each such presentation in the menu description or in text associated with the navigation buttons. However, users often do not know what they will record on a disk prior to such recording. Further, creation of a menu requires a user to know in advance where on the disc a particular presentation is recorded. Without such information, it is impossible to identify the location on the disc to which a button should cause the DVD player to jump when activated.

Going back after various video recording sessions to insert a menu is also a problem. Such an approach requires a user to play back or jump through the recorded video to try to locate the particular presentation to which a navigation button will cause the player to jump. Since the exact location of the desired video presentation is unknown, this can be a very tedious process.

SUMMARY OF THE INVENTION

A method for real time generation of menus in a DVD recorder is disclosed. The method includes the steps of providing a template menu having one or more dummy buttons, activating a marking command during a video data recording session, and in response to the marking command, modifying the template menu by assigning to the dummy button a valid flow control command for accessing the video data at a time corresponding to said activating step.

According to one aspect, the method can include the step of storing the template menu on the DVD prior to the recording session. According to yet another aspect, the method can include the step of controlling a display parameter of the dummy button responsive to the marking command to make the dummy button visible. According to still another aspect, the method can include configuring the template menu with a selected number of dummy buttons responsive to a user input.

The method can include the step of modifying the template menu after the video data recording session. For example, a button language, button appearance, button text, menu name and menu background can be modified. Alternatively, the modifying step can include changing the appearance of a button to a thumb-nail image. For example, the thumb-nail image can be a scene determined by the video data recorded during the video data recording session. According to yet another alternative, the modifying step can include deleting a button.

According to an alternative embodiment, a system is provided for real time generation of menus in a DVD recorder. The system includes DVD recording hardware with suitable processing capabilities for providing a template menu having one or more dummy buttons. The system also provides for activating a marking command during a video data recording session, and in response to the marking command, modifying the template menu by assigning to the dummy button a valid flow control command for accessing the video data.

According to one aspect, the system can store the template menu on the DVD prior to the recording session. According to yet another aspect, the system can control a display parameter of the dummy button responsive to the marking command to make the dummy button visible. According to still another aspect, the system can configure the template menu with a selected number of dummy buttons responsive to a user input.

The system can modify the template menu after the video data recording session. For example, a button language, button appearance, button text, menu name and menu background can be modified. Alternatively, the system can modify the appearance of a button to appear as a thumb-nail image. For example, the thumb-nail image can be a scene determined by the video data recorded during the video data recording session. According to yet another alternative, the system can delete a button when the button is no longer needed.

According to a further aspect of the invention, if the number of buttons necessary to access the various video segments exceeds the amount of space practically available on the menu, then a second menu screen can be automatically added to include the additional buttons. The second menu screen can be accessed, for example, by a "next menu" button which can be included on the first menu screen.

DETAILED DESCRIPTION OF THE PREFERRED EMBODIMENTS

Recordable DVD Device

Figure 1:
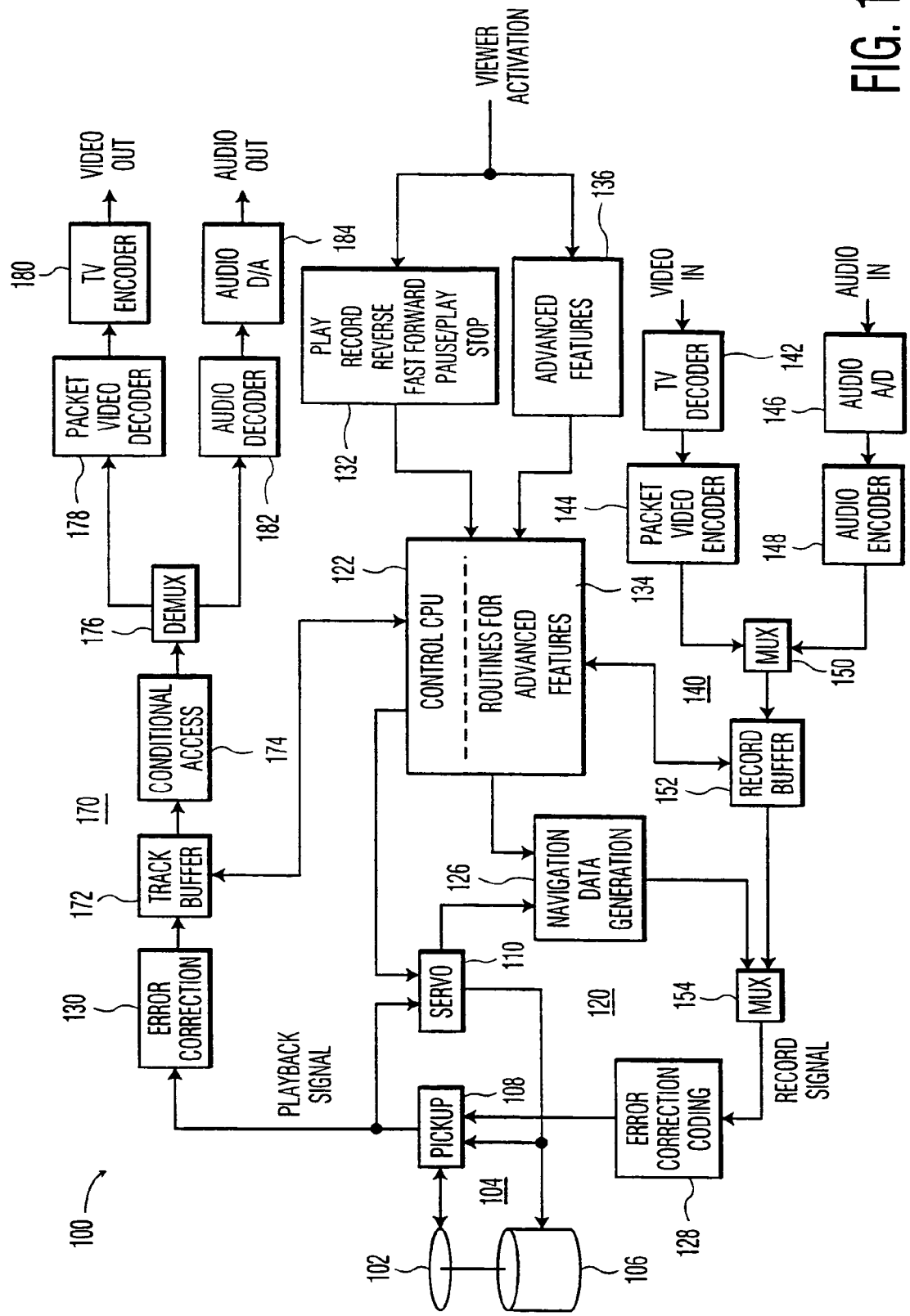
FIG. 1 is a block diagram of a rewritable DVD device that can be provided with one or more advanced operating features in accordance with the inventive arrangements.

A device 100 for implementing the various advanced operating features in accordance with the inventive arrangements taught herein utilizes a rewritable disc medium 102 in accordance with the inventive arrangements is shown in block diagram form in FIG. 1. The rewritable disc medium 102 is embodied as a rewritable DVD in the illustrated embodiment. In many instances, as will be noted, the rewritable disc medium can also be, for example, a hard drive or a magneto optical disc (MOD). An example of a MOD is a mini-disc. In many instances, the inventive arrangements are applicable to video or audio or both video and audio.

The device 100 is capable of writing onto and reading from the disc medium, in this example, a rewritable DVD 102. The device comprises a mechanical assembly 104, a control section 120, a video/audio input processing path 140 and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 that is adapted to be moved over the spinning disc. A laser on the pickup assembly burns spots onto a spiral track on the disc or illuminates spots already burned onto the track for recording and playing back video and/or audio program material. For purposes of understanding the invention, it is irrelevant whether the disc is recordable on one or two sides, or in the event of a double-sided recording, whether the double-sided recording, or subsequent reading from the disc, takes place from the same side of the disc or from both sides. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122 and a navigation data generation circuit 126. The control CPU 122 supplies a first input signal to the navigation data generation circuit 126 and the servo 110 supplies a second input signal to the navigation data generation circuit 126. The servo can also be considered part of the control section. The navigation data generation circuit 126 supplies a first input signal to the multiplexer (MUX) 154, which forms part of the video/audio input processing path 140. The output of the MUX 154 is an input to an error correction coding circuit 128. The output of the error correction coding circuit 128 is a recordable input signal supplied to the pickup 108, which will be "burned" onto the spiral track of the disc 102 by the laser.

The control CPU 122 also preferably has access to the data contained in the track buffer 172 and record buffer 152 as shown in FIG. 1. CPU 122 can delete, modify, and reformat video data stored in the track buffer 172 and record buffer 152 for the purpose of implementing the inventive arrangements. Suitable software or firmware is provided in memory for the conventional operations performed by control CPU 122. In addition, program routines for the advanced features 134 are provided for controlling CPU 122 in accordance with the invention as shall hereinafter be described in greater detail.

A control buffer 132 for viewer activatable functions indicates those functions presently available, namely play, record, reverse, fast forward, pause/play and stop. The pause is a counterpart to pause operation in a VCR, for example manually interrupting the play back of a prerecorded program or interrupting the recording of a viewed program to eliminate commercials from the recording. A separate buffer 136 is provided to receive commands for implementing the inventive arrangements taught herein.

The video/audio input processing path 140 is a signal processing circuit for converting a conventional television signal, for example NTSC or PAL, into digitized packet data, for example MPEG-1 or MPEG-2, for digital recording by the device 100. The input path 140 comprises an NTSC decoder 142 and video encoder, for example MPEG-1 or MPEG-2, 144 for video in, and comprises an audio analog-to-digital converter (A/D) 146 and an audio encoder, for example MPEG-1 or MPEG-2, 148. The digitized signals are combined in a multiplexer 150 and stored in a record buffer 152 until an entire packet has been constructed. As groups of packets are constructed, they are combined with the output of the navigation data generation circuit in the MUX 154 and sent to the error correction coding circuit 128. Error correction coding circuit 128 can also be deemed to be part of the input path 140.

As a practical matter, the smallest addressable unit on the spiral track of a DVD is an ECC (error correction code) block of 16 sectors, where each sector includes 2048 bytes of user data. A group is a number of ECC blocks, for example 12. Each group of blocks represents approximately 0.5 seconds of combined video and audio program material. The amount of linear space along the spiral track needed to record a group of ECC blocks, for example 192 sectors, is defined herein as a segment of the spiral track. Accordingly, it can appear that the record buffer needs to be only large enough to store one segment of data. One segment of data can correspond, for example, to approximately 0.5 seconds of audio and video program material.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing. Accordingly, it can also appear that the track buffer 172 needs to be only large enough to store one segment of data, also corresponding to approximately 0.5 seconds of audio and video program material.

The video is decoded by decoder 178, for example from MPEG-1 or MPEG-2, and encoded as a conventional television signal, for example NTSC or PAL. The audio is decoded by circuit 182, for example from MPEG-1 or MPEG-2, and converted to analog form by audio digital-to-analog (D/A) converter 184. The output processing path 170 can be deemed to include the error correction circuit 130, as noted.

DVD Media

Figure 2:
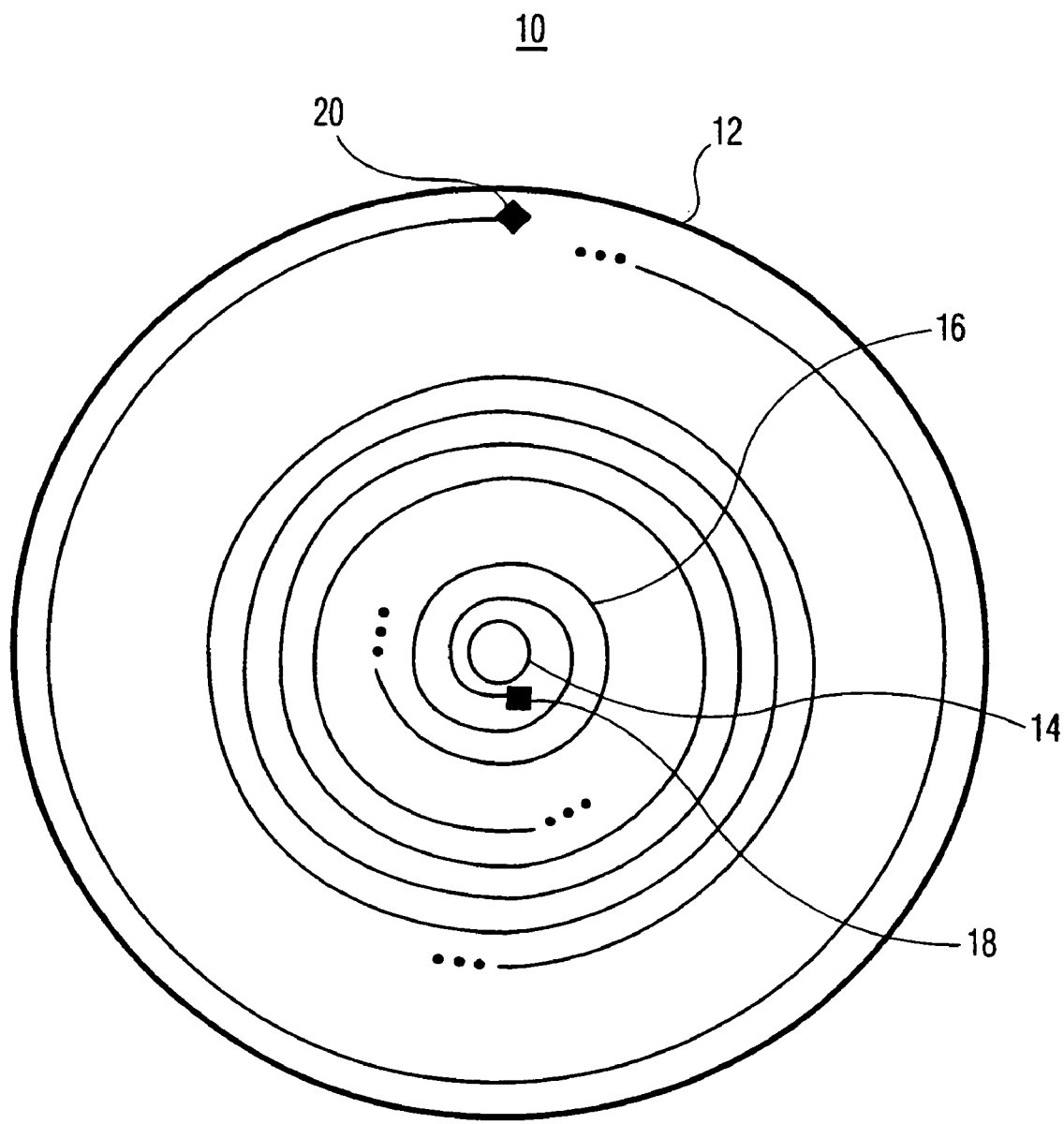
FIG. 2 is a diagram useful for illustrating the spiral track on a rewritable DVD.

For purposes of illustrating the inventive arrangements, program material can be recorded onto a rewritable DVD and played back from a rewritable DVD. A rewritable DVD 10 shown in FIG. 2 is suitable for use as disc 102 in device 100. The disc 10 is formed by a flat, round plastic plate-like member 12 having a hole 14 in the middle. The direction of recording on the track is typically outwardly along a spiral track 16, from a smaller radius part of the spiral to a larger radius part of the spiral. The several series of three large dots (_ _ _) denote portions of the track not shown in the drawing. As a result, the beginning of the spiral track is deemed to be near the hole 14, and is denoted by square 18. The end of the spiral is deemed to end near the rim, and is denoted by diamond 20. Those skilled in the art generally accept defining the beginning and end of the spiral as noted. Certain advanced features in accordance with the inventive arrangements utilize backward recording, that is, from a larger radius part of the spiral to a smaller radius part of the spiral. The track can also have a side-to-side wobble, not shown in the drawing, to accommodate media type indexing. Due to difficulties of scale only portions of the track 16 are shown, and these are shown in greatly enlarged scale.

Each nearly circular, radially concentric section of the spiral is sometimes referred to as a track, but this terminology is not commonly accepted as having that specific meaning. In CD-ROM's, for example, the term track is also used to refer to that portion of the spiral track that contains a single audio song, or other selection, and the same may or may not become common for DVD's.

Various modifications of the device illustrated in FIG. 1 and the disc medium illustrated in FIG. 2 can be used together to implement the advanced features taught herein in accordance with the inventive arrangements. It will be appreciated that the advanced features taught herein are applicable to other kinds of disc media and disc media players and recorders.

Figure 3:
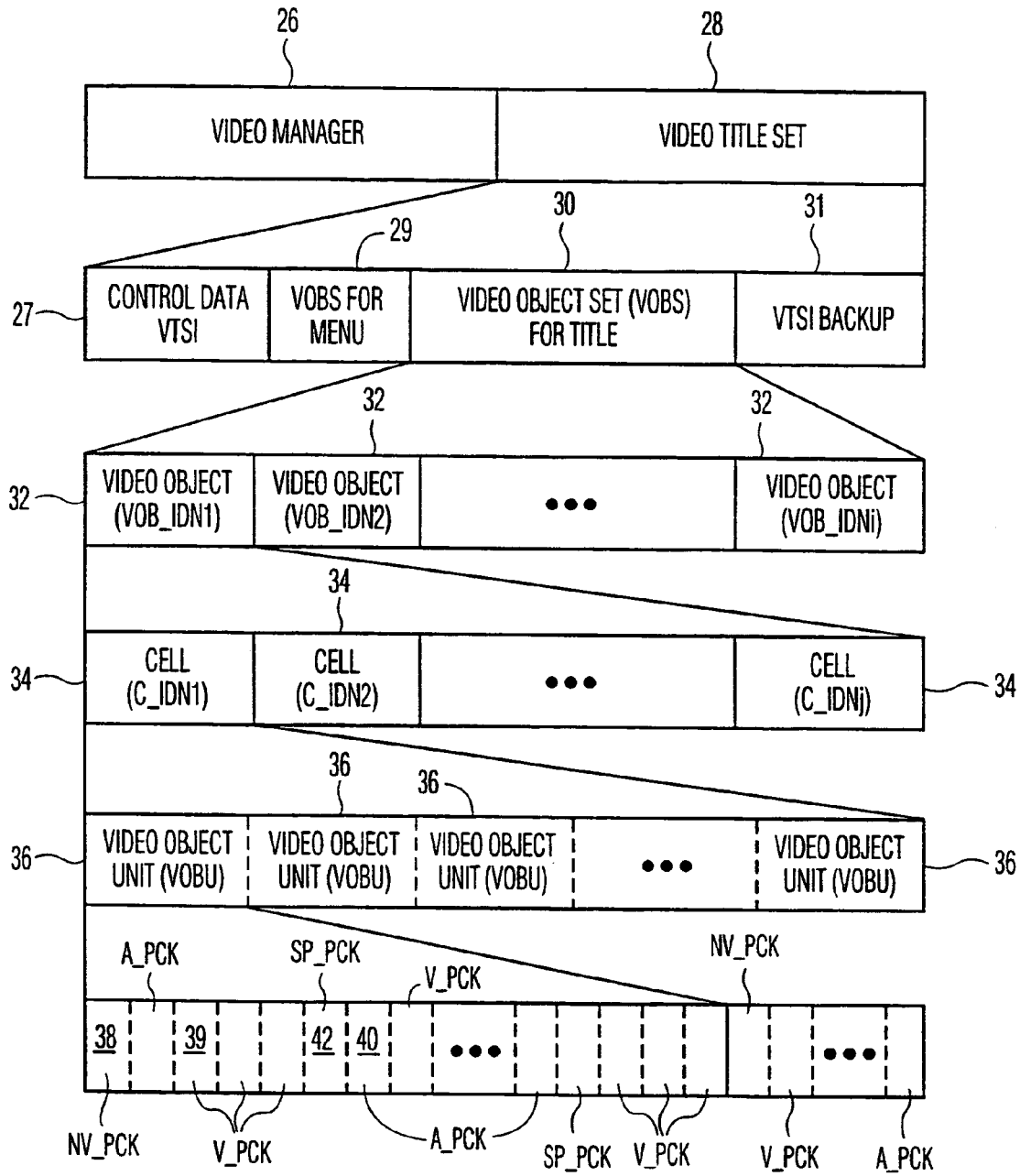
FIG. 3 is a diagram useful for explaining the organization of video disc.

As shown in FIG. 3, each DVD contains a video manager 26 and video title set (VTS) 28. The VTS includes video title set information (VTSI) 27, an optional video object set for menu 29, and one or more VOBS for title 30 which contains the actual title content. Each VOBS 30 also includes a plurality of video objects 32. Each video object 32 includes a plurality of cells 34. Each VOBS is comprised of a collection of pointers to cells. In this way, the VOBS data links cells together and indicates in what order the programs or cells are to be played. Cells within a particular VOBS can be flagged for play in any desired order. For example, they can be played sequentially or randomly.

Each cell includes a plurality of VOBUs 36. Each of the VOBUs 36 in which the video content of the disc resides typically contains 0.4 to 1.0 seconds of presentation material. Each VOBU 36 is a sequence of data packs in recording order. Each VOBU starts with exactly one navigation pack (NV_PCK) 38 and could encompass all of following kinds of packs, including video packs (V_PCK) 39, audio packs (A_PCK) 40 and sub-picture packs (SP_PCK) 42. Each VOBU is nominally comprised of one group of pictures (GOP).

The NV_PCK 38 contains presentation control information as well as data search information. The data search information is useful in performing "trick" modes of playback, that is, any mode of DVD device operation other than normal play, stop and pause. One aspect of data search information (DSI) is that it helps the decoder to find reference pictures within the VOBU corresponding to the current NV_PCK. Another aspect of the DSI is that it helps the decoder to find VOBUs far into the future or past of presentation, relative to the current VOBU. The VOBUs in the past relative to the current VOBU presentation are referenced in fields of the NV_PCK known as the BWDI (backward information). The VOBUs in the future relative to the current VOBU presentation are referenced in fields of the NV_PCK known as FWDI (forward information).

Each VOBS can include navigation commands which permit branching or other interactive features. These navigation commands can be included as part of the VOBS as a set of pre-commands. These pre-commands can be followed by optional navigation commands identified within the NV_PCK 38 of the cells 34, which commands are executed after the cell is presented. Finally these may be followed in the VOBS by an optional set of post-commands. All of these commands are stored in a table within the VOBS and can be referenced by number so that they can be used repeatedly. The navigation commands can direct the control CPU 122 to perform a variety of operations associated with branching or interactive features. For example, they can provide flow control with commands such as goto, link, jump, exit, and so on.

A menu is a set of buttons which can permit a user to control a video presentation. Information to create menu buttons is included in the command data. Buttons can be drawn on the video background of a display, and DVD allows control over the appearance of the buttons. Invisible buttons can be created by setting the pixel contrast to zero. Each button has a command with which it is associated. In most instances, these will be flow control commands as described above. For the purpose of accessing a plurality of VOBS 30 on a disc containing different video presentations, a menu construct can be provided in the VOBS for menu 29. The menu in this case has navigation commands associated with each of the buttons of the menu.

Three-Stage Menu Processing for DVD Recorder

Figure 8:
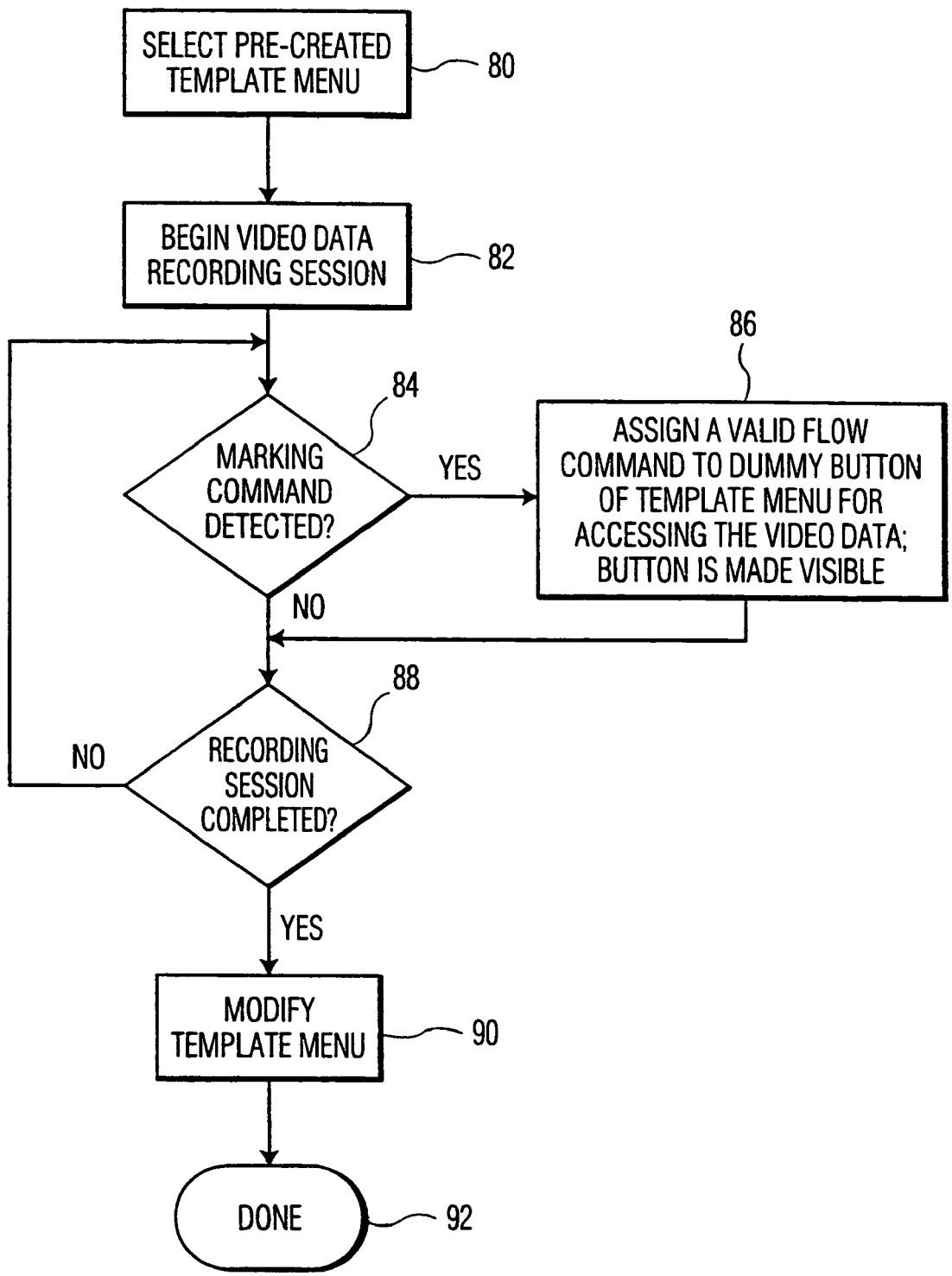
FIG. 8 is a flow chart useful for illustrating the process according to the inventive arrangements.

The present invention makes use of three-stage menu processing to solve the problems that make real-time generation of navigation menus difficult in recordable DVD. FIG. 8 is a flowchart useful for illustrating the process. The first stage involves preprocessing of a menu. In step 80, a pre-created template menu can be provided or selected by a user with a set of hidden or invisible buttons. The user can select the number of buttons to be associated with the template menu. Further each of the buttons may have certain languages associated with it. For example, to facilitate use in various regions of the world, the language associated with the buttons may include English, Spanish, or French. The template menu is preferably stored in memory, or can be created by embedded software in the DVD player.

Figure 4:
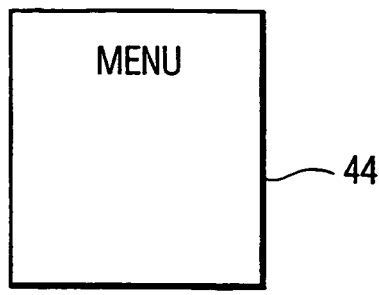
FIG. 4 is a diagram useful for illustrating a blank menu used in accordance with the inventive arrangements.

Each button associated with the template menu preferably has dummy (i.e., empty) command(s) pre-recorded therewith or no commands at all. The template buttons are initially configured such that when these buttons are activated, the software commands, if any, associated therewith will be of no consequence and will have no effect. Further, the buttons in the template menu are preferably configured so that they are hidden and are therefore not displayed. Thus, the template menu 44 initially appears as an essentially blank screen as shown in FIG. 4.

In the second stage, if a menu is needed during recording, the pre-created template menu 44 can be copied to a location on the disc for the VOBS for menu 29. Subsequently, the recording process can begin in step 82. In step 84, the control CPU 122 determines whether a marking command has been detected. If the marking command is detected by control CPU 122 in step 84, it causes a non-dummy command, such as a flow control command, to be associated with one of the existing hidden buttons. The marking command will cause a record to be made of the location in the bit stream corresponding to the point in time when the marking command was received. The non-dummy command associated with the menu button can be configured to reference the recorded location in the bit stream for allowing subsequent accessing of video data recorded at that location on the disk.

The marking command can be initiated by any suitable means. For example, the user can activate a control button for the DVD device 100 or the command could be automatically initiated by a software program routine for controlling the operation of control CPU 122. Such a marking command can be input by means of a suitable user interface operatively connected to advanced feature buffer 136. If a software routine is used for this purpose, then under certain predefined conditions, such as each time a recording session of some length is begun, the marking command can be generated. As a result of the marking command, the system proceeds to step 86 and one of the dummy buttons on the template menu 44 will become visible and navigable.

Figure 5:
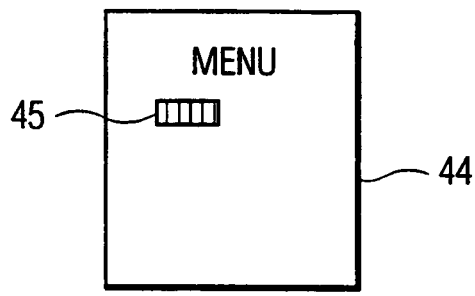
FIG. 5 is a diagram useful for illustrating a menu with a single button in accordance with the inventive arrangements.
Figure 6:
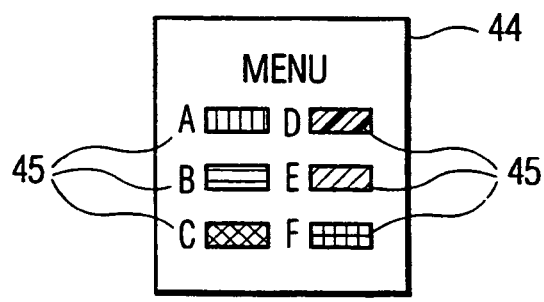
FIG. 6 is a diagram useful for illustrating a menu with six buttons in accordance with the inventive arrangements.

FIG. 5 illustrates a template menu 44 after one buttons 45 has been activated. In particular, the pixel contrast of the button has been changed to some value other than zero so that it is visible on screen. In addition, a valid navigation or flow control command is now assigned to the button, replacing the dummy command, if any. FIG. 6 illustrates the same menu 44 after six of the buttons 45 have been activated so that each is now visible and assigned a valid flow control command which will cause the DVD player 100 to jump to the scene which has been marked.

Figure 7:
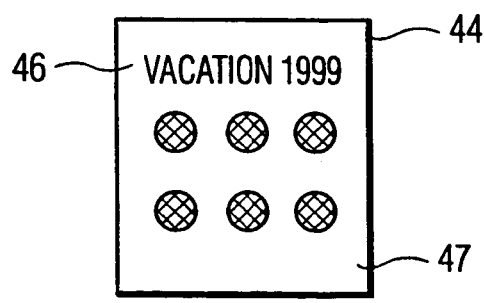
FIG. 7 is a diagram useful for illustrating a menu in which the buttons and menu title have been modified in accordance with the inventive arrangements.

When the recording session is completed as determined in step 88, the third stage of the process can begin. In the third stage, subsequent to recording the video presentation material and marking any presentations as described above, the menu 44 can be modified as desired in step 90. For example, the menu name 46 can be changed and the particular appearance of the buttons can be altered as shown in FIG. 7. According to one embodiment of the invention, the buttons can be made to appear as thumb-nail still images. For example, the thumb-nail image can be the first picture associated with the recording to which the buttons will cause the player to jump. The background 47 for the menu 44 can also be changed to an appearance selected by the user.

Alternatively, a button can be removed from the menu by deleting the valid flow control command or converting the command back to a dummy command. If no non-dummy commands associated with a button exist, the button will become invisible and non-navigable. If necessary, the languages on the menu and the content of the menu can also be altered after recording.

According to a further aspect of the invention, if the number of buttons necessary to access the various video segments exceeds the amount of space practically available on the menu, then a second menu screen can be automatically added to include the additional buttons. The second menu screen can be accessed, for example, by a "next menu" button which can be included on the first menu screen.

The inventive arrangements provide great user flexibility to enable personalized menus to be added to recordings. Separating the menu processing into three stages, namely pre-processing, recording, and post-processing, in accordance with the inventive arrangements provides enhanced user convenience and flexibility.

The invention claimed is:

1. A method for real time generation of menus in a DVD recorder comprising the steps of:
providing a template menu having at least one dummy button;
activating a marking command during a video data recording session; and
responsive to said marking command, modifying said template menu by assigning to said dummy button a valid flow control command for accessing said video data which has been recorded at a time corresponding to said activating step.

2. The method according to claim 1 further comprising the step of storing said
template menu on said DVD prior to said recording session.

3. The method according to claim 1 further comprising the step of controlling a display parameter of said dummy button responsive to said marking command to make said dummy button visible.

4. The method according to claim 1 further comprising configuring said template menu with a selected number of dummy buttons responsive to a user input.

5. The method according to claim 1 further comprising the step of modifying said template menu after said video data recording session.

6. The method according to claim 5 wherein at least one of a button language, button appearance, button text, menu name and menu background is modified.

7. The method according to claim 5 wherein said modifying step comprises changing the appearance of a button to a thumb-nail image.

8. The method according to claim 7 wherein said thumb-nail image is a scene determined by said video data recorded during said session.

9. The method according to claim 8 wherein said modifying step comprises deleting a button.

10. The method according to claim 1, further comprising providing a second template menu accessible from said first template menu if additional buttons are needed.

11. A system for real time generation of menus in a DVD recorder comprising:
means for providing a template menu having at least one dummy button;
means for activating a marking command during a video data recording session; and
means responsive to said marking command, for modifying said template menu by assigning to said dummy button a valid flow control command for accessing said video data which has been recorded at a time corresponding to said activating step.

12. The system according to claim 10 further comprising means for storing said
template menu on said DVD prior to said recording session.

13. The system according to claim 10 further comprising means for controlling a display parameter of said dummy button responsive to said marking command to make said dummy button visible.

14. The system according to claim 10 further comprising means for configuring said template menu with a selected number of dummy buttons responsive to a user input.

15. The system according to claim 10 further comprising means for modifying said template menu after said video data recording session.

16. The system according to claim 14 wherein at least one of a button language, button appearance, button text, menu name and menu background is modified.

17. The system according to claim 14 wherein said modifying step comprises changing the appearance of a button to a thumb-nail image.

18. The system according to claim 16 wherein said thumb-nail image is a scene determined by said video data recorded during said session.

19. The system according to claim 17 wherein said modifying step comprises deleting a button.

20. The system according to claim 11 further comprising means for automatically providing a second template menu if additional buttons are needed.

* * * * *

UNITED STATES PATENT AND TRADEMARK OFFICE
CERTIFICATE OF CORRECTION

PATENT NO. : 7,127,149 B1 Page 1 of 1
APPLICATION NO. : 10/129859
DATED : October 24, 2006
INVENTOR(S) : Shu Lin It is certified that error appears in the above-identified patent and that said Letters Patent is hereby corrected as shown below:

Title page, item 56 References Cited insert

--6,199,082 B1 * 3/2001 Ferrel et al. 715/522--

Signed and Sealed this

Sixth Day of February, 2007

JON W. DUDAS
*Director of the United States Patent and Trademark Office*